US012657864B2

(12) United States Patent
    Griffin et al.

(10) Patent No.:    US 12,657,864 B2
(45) Date of Patent:    Jun. 16, 2026

(54) ADAPTIVE COLOR MITIGATION FOR NON-UNIFORMITY AMONGST LENSES

(71) Applicant: Connaught Electronics Ltd., Tuam (IE)

(72) Inventors: Mark Patrick Griffin, Tuam (IE); Luke Jonathan Kuza, Tuam (IE)

(73) Assignee: Connaught Electronics Ltd. (IE)

( * ) Notice: Subject to any disclaimer, the term of this patent is extended or adjusted under 35 U.S.C. 154(b) by 391 days.

(21) Appl. No.: 18/213,104

(22) Filed: Jun. 22, 2023

(65) Prior Publication Data

US 2024/0428553 A1    Dec. 26, 2024

(51) Int. Cl.
    G06V 10/56    (2022.01)
    G06V 10/60    (2022.01)
    G06V 20/56    (2022.01)

(52) U.S. Cl.
    CPC .............. G06V 10/56 (2022.01); G06V 10/60 (2022.01); G06V 20/56 (2022.01)

(58) Field of Classification Search
    CPC ......... G06V 10/56; G06V 10/60; G06V 20/56
    See application file for complete search history.

(56) References Cited

U.S. PATENT DOCUMENTS

| | | | |
|---|---|---|---|
| 5,384,601 A | 1/1995 | Yamashita et al. | |
| 6,574,363 B1 * | 6/2003 | Classen .................. | H04N 9/643 |
| | | | 348/E9.04 |
| 7,668,368 B2 | 2/2010 | Kimura | |
| 8,194,159 B2 | 6/2012 | Wang et al. | |
| 8,310,571 B2 | 11/2012 | Koishi | |
| 10,540,756 B2 | 1/2020 | Junglas et al. | |
| 2006/0139707 A1 | 6/2006 | Kimura | |
| 2018/0204310 A1 | 7/2018 | Junglas et al. | |

FOREIGN PATENT DOCUMENTS

| | | | | |
|---|---|---|---|---|
| DE | 102016121755 A1 | | 5/2018 | |
| DE | 102018110597 A1 | | 11/2019 | |
| WO | WO-2010147941 A1 * | 12/2010 | ........... | H04N 1/6058 |
| WO | WO-2019169589 A1 * | 9/2019 | ............. | H04N 25/41 |

OTHER PUBLICATIONS

German Search Report for German Application No. DE 10 2024 113 941.2, Dated Mar. 18, 2025, English Translation attached to Original document, All together 19 Pages.

* cited by examiner

*Primary Examiner* — Vu Le
*Assistant Examiner* — Matthew James Bodnark
(74) *Attorney, Agent, or Firm* — Dickinson Wright PLLC

(57)    ABSTRACT

Systems and methods for altering colors of pixels of images produced by cameras using a lens. A plurality of generated images are received, and color channel values and luminance values of image pixels are determined. Benchmark U-color thresholds and V-color thresholds are established based on the color channels and luminance associated with the pixels. A first image generated using a first lens of a first camera is received. U-color values and V-color values associated with first pixels of the first image are determined. A uniformity score associated with the first lens is received. The benchmark U-color and V-color thresholds are altered based on the uniformity score. The U-color values and V-color values of the first pixels are corrected in response to the U-color values being within the altered U-color thresholds and the V-color values being within the altered V-color thresholds.

19 Claims, 7 Drawing Sheets

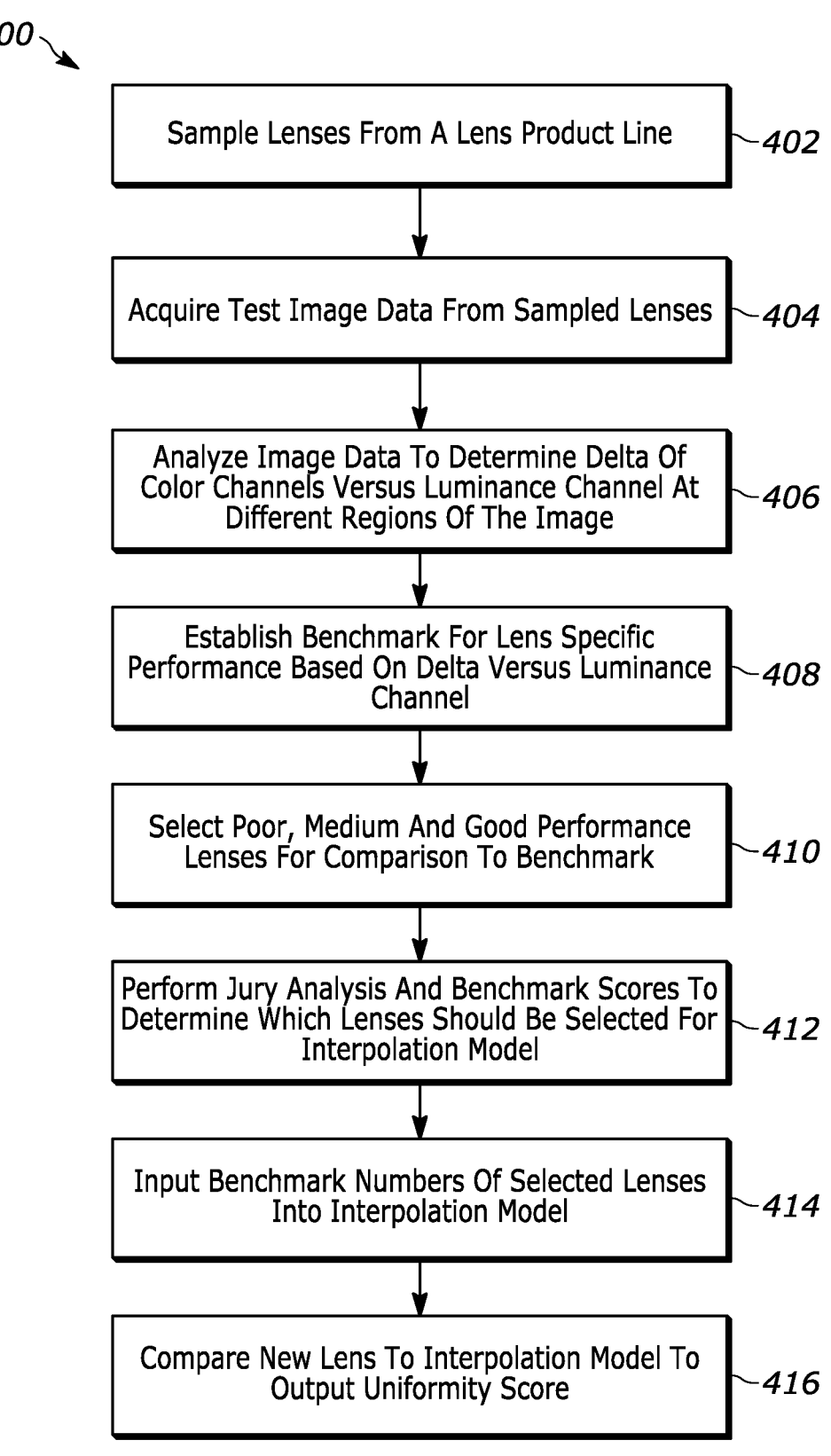

*400*

| Sample Lenses From A Lens Product Line | 402 |

| Acquire Test Image Data From Sampled Lenses | 404 |

| Analyze Image Data To Determine Delta Of Color Channels Versus Luminance Channel At Different Regions Of The Image | 406 |

| Establish Benchmark For Lens Specific Performance Based On Delta Versus Luminance Channel | 408 |

| Select Poor, Medium And Good Performance Lenses For Comparison To Benchmark | 410 |

| Perform Jury Analysis And Benchmark Scores To Determine Which Lenses Should Be Selected For Interpolation Model | 412 |

| Input Benchmark Numbers Of Selected Lenses Into Interpolation Model | 414 |

| Compare New Lens To Interpolation Model To Output Uniformity Score | 416 |

ADAPTIVE COLOR MITIGATION FOR NON-UNIFORMITY AMONGST LENSES

TECHNICAL FIELD

The present disclosure relates to methods and system for adaptive color mitigation for non-uniformity amongst lenses.

BACKGROUND

To assist with parking or maneuvering during slow speeds, vehicles can be equipped with the ability to generate a top view on the vehicle display (e.g., infotainment screen). The top view, also referred to as a top-down view, an above view, or a bird's view, is generated by stitching together images from various cameras located about the vehicle. The images are processed, analyzed and stitched together to offer a synthetic but positionally accurate top view of the vehicle and its 360-degree surroundings; it appears to the driver as if a single image is taken of the vehicle and its surroundings from directly above the vehicle.

In order to improve the visual quality of the image on the vehicle display, brightness and color harmonization can be applied. With such harmonization, the brightness and color can be harmonized such that the image on the vehicle display appears more like it was taken from a single camera, rather than multiple camera images stitched together. For example, any differences in brightness or color hues amongst the various camera images can be smoothened or blended.

SUMMARY

According to an embodiment, a method for altering colors of pixels of images produced by vehicle cameras includes the following: receiving a plurality of images generated by a plurality of cameras configured to be equipped on a vehicle; determining color channel values and luminance values associated with pixels of the plurality of images; establishing a benchmark U-color threshold and a benchmark V-color threshold based on the color channels and luminance associated with the pixels of the plurality of images; receiving a first image generated using a first lens of a first camera; determining U-color values and V-color values associated with first pixels of the first image; receiving a first score associated with the first lens, wherein the first score is yielded via an interpolation model; altering the benchmark U-color threshold and the benchmark V-color threshold based on the first score to yield a first altered U-color threshold and a first altered V-color threshold specific to the first lens; and correcting the U-color values and the V-color values associated with the first pixels in response to (i) the U-color values associated with the first pixels being within the first altered U-color threshold and (ii) the V-color values associated with the first pixels being within the first altered V-color threshold.

According to another embodiment, a method for altering pixel colors of images products by a vehicle cameras includes the following: receiving a plurality of images generated by a plurality of cameras configured to be equipped on a vehicle; determining color channel values associated with pixels of the plurality of images; establishing a benchmark mitigation correction window on a UV color plane of a YUV color model, wherein the benchmark mitigation correction window defines boundaries that enable the color channel values associated with the pixels to be altered only if the color channel values are within the boundaries; determining first U-color values and first V-color values associated with first pixels of a first image generated using a first lens of a first camera; receiving a first score associated with the first image, wherein the first score is yielded via an interpolation model; and altering a size of the benchmark mitigation correction window based on the first score to yield an altered mitigation correction window.

According to another embodiment, a system for altering pixel colors of images produced by a vehicle camera includes a vehicle camera installed in a vehicle, wherein the vehicle camera includes a lens. The system also includes a processor coupled to the vehicle camera and programmed to: receive a benchmark U-color threshold and a benchmark V-color threshold that are determined based on color channels and luminance associated with pixels generated by other vehicle cameras; receive a first image generated from the vehicle camera; determine U-color values and V-color values associated with first pixels of the first image; receive a first score associated with the first image, wherein the first score is yielded via an interpolation model; alter the benchmark U-color threshold and the benchmark V-color threshold based on the first score to yield an altered U-color threshold and an altered V-color threshold; and correct the U-color values and the V-color values associated with the first pixels only if (i) the U-color values associated with the first pixels are within the first altered U-color threshold and (ii) the V-color values associated with the first pixels are within the first altered V-color threshold.

BRIEF DESCRIPTION OF THE DRAWINGS

FIG. 4 illustrates a method of grading lenses to establish a baseline or benchmark score of a particular lens, and comparing a particular lens to that benchmark score, according to an embodiment.

DETAILED DESCRIPTION

Figure 1:
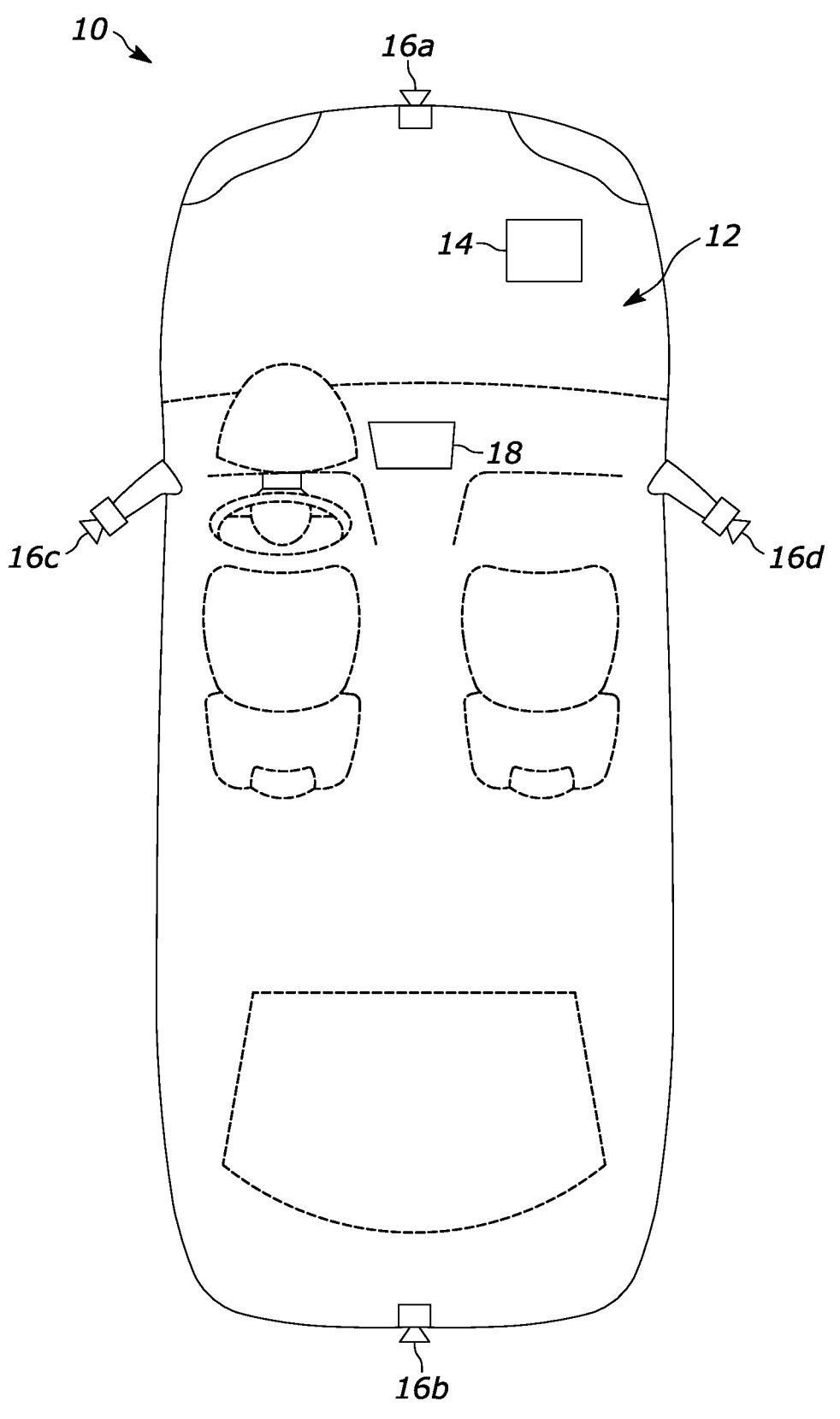
FIG. 1 is a schematic overhead view of a vehicle with a plurality of vehicle cameras, according to one embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

"A", "an", and "the" as used herein refers to both singular and plural referents unless the context clearly dictates otherwise. By way of example, "a processor" programmed to perform various functions refers to one processor programmed to perform each and every function, or more than one processor collectively performing each of the various functions.

Automotive vehicles (e.g., cars, trucks, vans, SUVs, etc.) can be equipped with a camera system that generates a top view on the vehicle display (e.g., infotainment screen, dashboard unit, tablet, mobile device, phone, etc.). The top view, also referred to as a top-down view, an above view, or a bird's eye view (BEV), is generated by stitching together images from various cameras located about the vehicle. The images are processed, analyzed and stitched together to offer a synthetic but positionally accurate top view of the vehicle and its 360-degree surroundings; it appears to the driver as if a single image is taken of the vehicle and its surroundings from directly above the vehicle. This view can assist the driver with parking or slow-speed maneuvering in tight spaces.

These camera systems typically include four or more cameras about the vehicle, mounted at or near the front, the rear, and either side of the vehicle. Each camera can independently have its own image signal processing prior to the images being stitched together. Therefore, the cameras may have different exposure, contrast, brightness, and the like. Since each camera faces in a different direction and sees different surrounding areas of the vehicle, the brightness and color values can be slightly different for each camera. These differences in color (chrominance) and brightness (luminance) can negatively affect the top view. For example, if one camera has a brightness or color exposure that varies greatly from that of another camera, the composite top view may not be aesthetically pleasing due to a corresponding stark change in brightness or color at certain points of the composite top view, especially at regions where the camera views are stitched together.

Due to this, harmonization techniques are applied when generating the top view to harmonize the merged camera images with respect to brightness and color. Harmonization algorithms are commonly used in image processing to harmonize fused camera images for brightness or luminance and chrominance. In general, harmonization works to perform color and brightness transformation amongst the images of different cameras. The color and brightness statistics of the images, when forming a composite top view, can be averaged and matched. For example, zones of the histogram are predicted or determined which can be best matched between the two images, and then the color is adjusted for both of the images such that the color is consistent in the composite view. German Patent Publication No. DE102016121755 ("the '755 Publication), titled Method For Determining A Composite Image Of A Surrounding Area Of A Motor Vehicle With Adaptation Of Brightness And/Or Color, Camera System And Power Vehicle, is incorporated by reference herein in its entirety.

The '755 Publication describes a harmonization technique in which calculated histograms are used as inputs to generate correction values for each camera and each corresponding Y, U, and V channel. The harmonization can be particularly helpful in areas that are seen by two or more of the cameras (in other words, areas where the views from the vehicle cameras overlap). German Patent Publication No. DE102018110597 ("the '597 Publication"), titled Method for Image Harmonization, Image Processing Device, Camera System and Motor Vehicle, is also incorporated by reference herein in its entirety. The '597 Publication described a harmonization technique in which a color analysis of regions of interests of multiple images is performed. A color correction value is determined depending on the color analysis, and is applied to part of the image so that the color of that image is adjusted.

FIG. 1 illustrates a schematic of such a vehicle 10 configured to perform the harmonization processes described herein. The vehicle 10 is illustrated as a passenger car, but the vehicle can be other types of vehicles such as a truck, van, or sports utility vehicle (SUV), or the like. The vehicle 10 includes a camera system 12 which includes an electronic control unit (ECU) 14 connected to a plurality of cameras 16a, 16b, 16c, and 16d. In general, the ECU 14 includes one or more processors programmed to process the images data associated with the cameras 16a-d and generate a composite top view on a vehicle display 18.

The ECUs disclosed herein may more generally be referred to as a controller. The ECU 14 can be capable of receiving image data from the various cameras (or their respective processors), processing the information, and outputting instructions to combine the image data in generating a composite top view, for example. In this disclosure, the terms "controller" and "system" may refer to, be part of, or include processor hardware (shared, dedicated, or group) that executes code and memory hardware (shared, dedicated, or group) that stores code executed by the processor hardware. The code is configured to provide the features of the controller and systems described herein. In one example, the controller may include a processor, memory, and non-volatile storage. The processor may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory. The memory may include a single memory device or a plurality of memory devices including, but not limited to, random access memory ("RAM"), volatile memory, non-volatile memory, static random-access memory ("SRAM"), dynamic random-access memory ("DRAM"), flash memory, cache memory, or any other device capable of storing information. The non-volatile storage may include one or more persistent data storage devices such as a hard drive, optical drive, tape drive, non-volatile solid-state device, or any other device capable of persistently storing information. The processor may be configured to read into memory and execute computer-executable instructions embodying one or more software programs residing in the non-volatile storage. Programs residing in the non-volatile storage may include or be part of an operating system or an application, and may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL. The computer-executable instructions of the programs may be configured to, upon execution by the processor, implement and execute the methods and processes explained herein, such as the harmonization techniques described herein, the interpolation model described herein, the adjustment of the U-color and V-color values of pixels, and the adjustment of the benchmark mitigation correction window as described herein.

In the embodiment illustrated in FIG. 1, the cameras 16-*d* are located about different quadrants of the vehicle, although more than four cameras may be provided in the camera system 12. Each camera 16*a-d* may have a fish-eye lens to obtain images with an enlarged field of view. In an example, a first camera 16*a* faces an area in front of the vehicle, and captures images with a field of view indicated by boundary lines 20*a*. The first camera 16*a* can therefore be referred to as the front camera or front view (FV) camera. A second camera 16*b* faces an area behind the vehicle. The second camera 16*b* can therefore be referred to as the rear camera or rear view (RV) camera. A third camera 16*c* faces an area on the left side of the vehicle, and can therefore be referred to as the left camera, or left-side camera. The third camera 16*c* can also be mounted on or near the vehicle's left wing mirror, and can therefore be referred to as a mirror left (ML) camera. A fourth camera 16*d* faces an area on the right side of the vehicle, and can therefore be referred to as the right camera, or right-side camera. The fourth camera 16*d* can also be mounted on or near the vehicle's right wing mirror, and can therefore be referred to as a mirror right (MR) camera. The images (or the associated image data) originating from the cameras 16*a-d* can be processed by the ECU 14 (e.g., stitched together, distorted, combined, and harmonized) to generate the composite top view on the vehicle display 18.

Figure 2A:
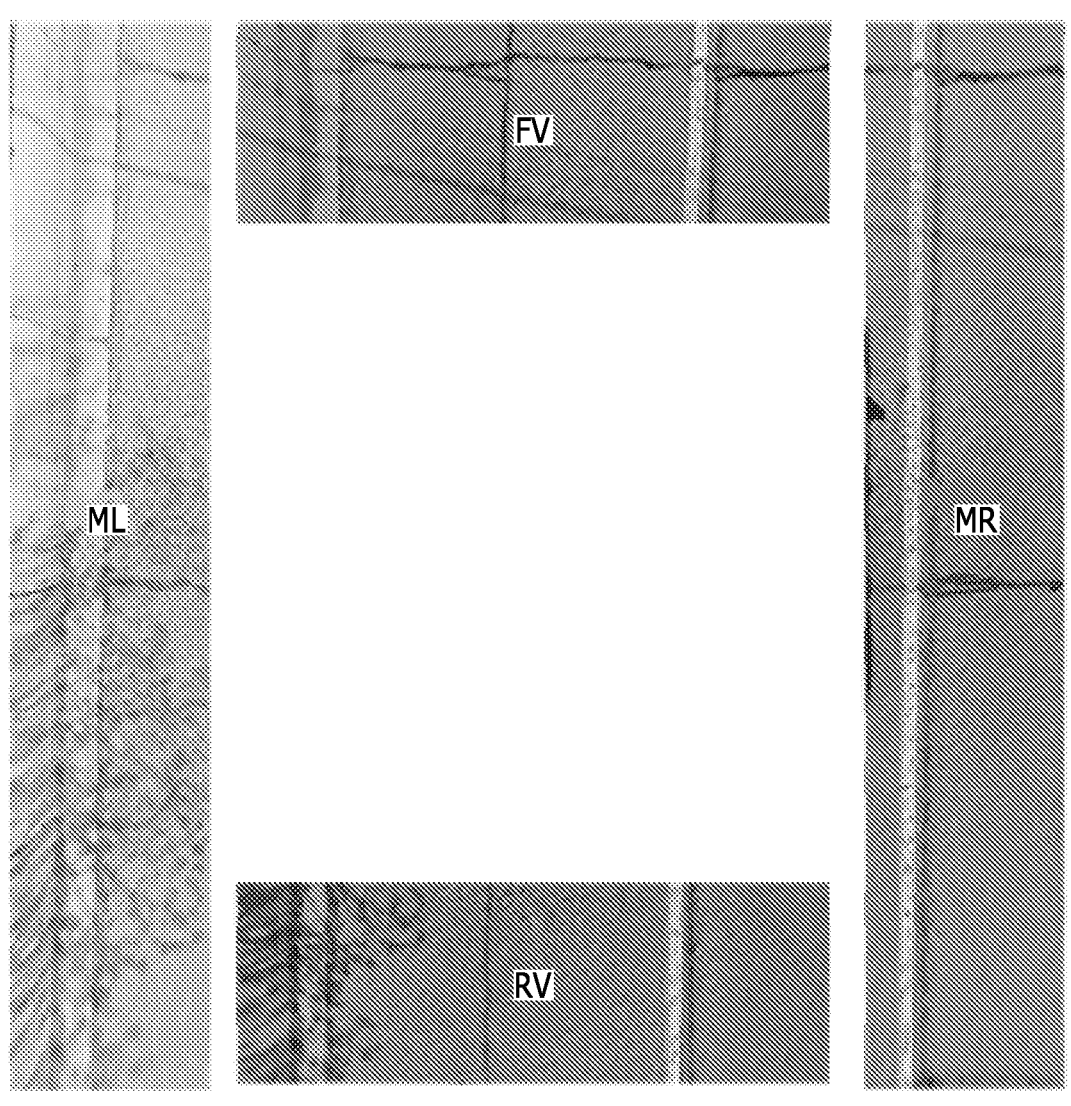
FIG. 2A illustrates a schematic representation of image areas captured by the various vehicle cameras, according to an embodiment.
Figure 2C:
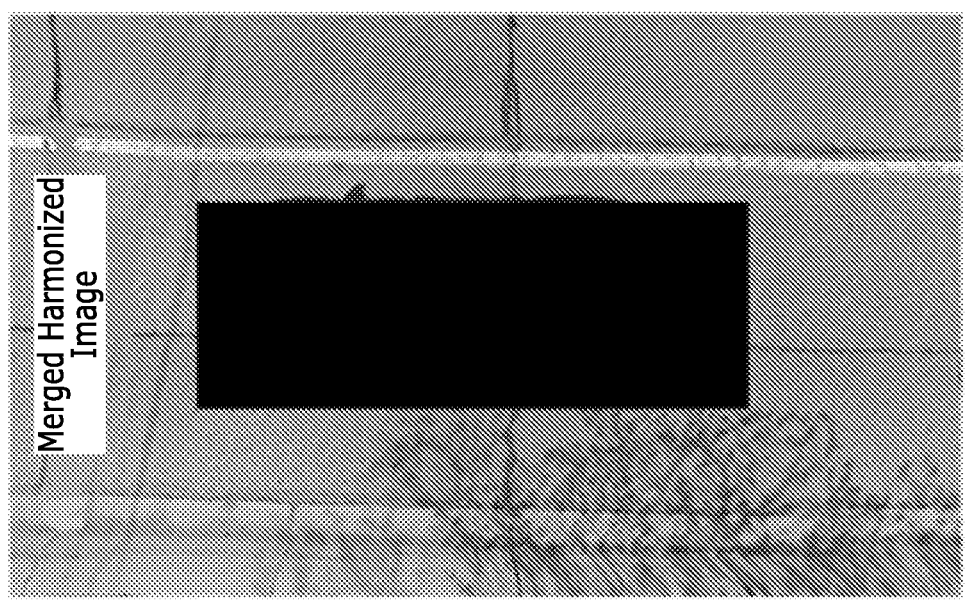
FIG. 2C illustrates an example of the various image areas of FIG. 2A merged or stitched together, and harmonized.
Figure 2B:
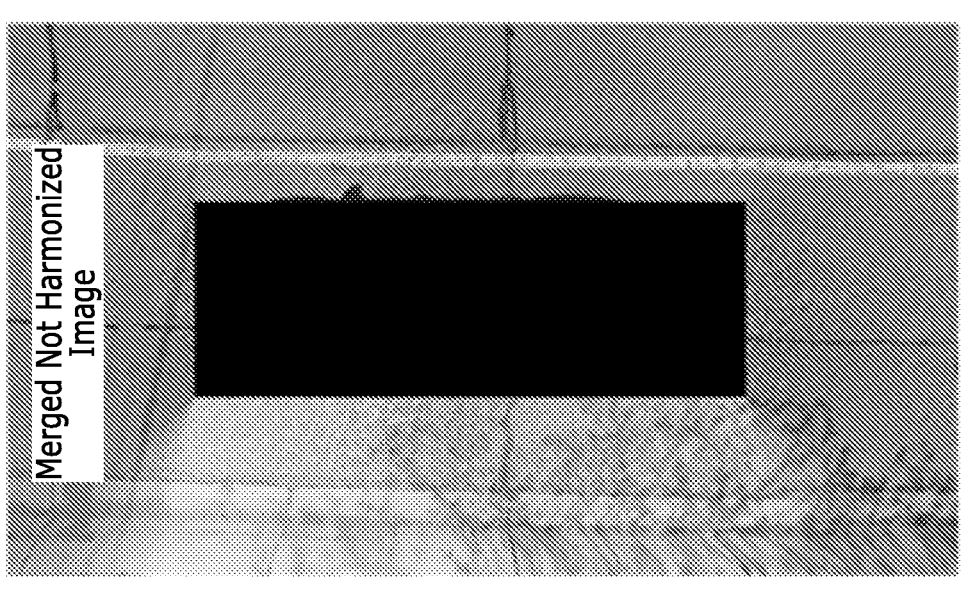
FIG. 2B illustrates an example of the various image areas of FIG. 2A merged or stitched together but not harmonized.

FIG. 2A shows a schematic representation of image areas captured by the various cameras 16*a-d*. Here, images areas associated with each of the cameras 16*a-d* are as follows: the front camera 16*a* produces an image of a front view (FV) area; the rear camera 16*b* produces an image of a rear view (RV) area; the left-side camera 16*c*, or mirror left camera, produces an image (ML) of a left side view area; the right-side camera 16*d*, or mirror right camera, produces an image (MR) of a right side view area. Each of these images can be referred to as a partial image, and the ECU can stitch or merge these partial images together into a single top view of the area surrounding the vehicle. These four partial images can for example be combined with each other into a 360 degree image of the environment or a top view of the motor vehicle. This is shown in FIG. 2B. However, if the top view is not properly harmonized, a harsh contrast can be noticed in the views as seen by the partial images. Notice, for example, in FIGS. 2A-2B how the ML and MR images are much lighter than the FV and RV images. This can be due to, for example, a variance in the environmental brightness detected by those associated cameras. Image harmonization (such as those described in the '597 Publication) can harmonize the partial images by adjusting the brightness and/or color values of the pixels that make up the partial images so that a more aesthetically pleasing and consistent top view is provided. The result of this is shown in FIG. 2C.

Non-uniformities amongst the camera lenses of the vehicle cameras can impact the harmonization process. For example, damage, manufacturing defects, misapplied lens coating, and the like can cause poor performance of the camera, such as color shifts or hue shifts. Depending on the condition of the camera lens, a hue in an area of the image may have a color cast towards cyan or blue, while a hue in another area of the image may have a color cast toward magenta or red. If so, a hue of a monochromatic area in the image may sway locally. This for example leads to individual subareas of the image having a blue cast visible to a viewer of the image, whilst other subareas of the image have a red cast. Often this non-uniformity with regard to the hue occurs in edge regions of the image, which are arranged far away from an image center, which can impact harmonization particularly.

Recent advances have been made in mitigating these non-uniformities. For example, U.S. patent application Ser. No. 17/656,359, titled METHOD FOR REDUCING A COLOR SHIFT OF IMAGE PIXELS OF AN IMAGE FOR A MOTOR VEHICLE CAPTURED BY A CAMERA (which is incorporated by reference herein in its entirety) discloses methods for reducing the color shift of image pixels. Image pixel color information is determined and compared to minimum and maximum boundaries or thresholds. For example, U-color and V-color values are compared to respective minimum and maximum boundaries. If the color information is within the minimum and maximum boundaries, the color information is corrected.

However, defects can occur lens by lens, and performance can vary amongst various lenses. For example, even within a single vehicle, one lens of a camera can be performing quite poorly compared to another lens of another camera in that vehicle. It would be beneficial to adjust the color mitigation on a lens-by-lens basis. Therefore, according to various embodiments described herein, methods and systems are provided whereby U-color values and V-color values are altered based on their color values being located within thresholds or boundaries; and these thresholds or boundaries can vary depending on the performance score of that particular lens. This allows for more of an opportunity to alter color values of poor performing lenses compared to good performing lenses—the thresholds which are necessary to be met in order for color value adjustment to occur are altered on a lens-by-lens basis.

Figure 3:
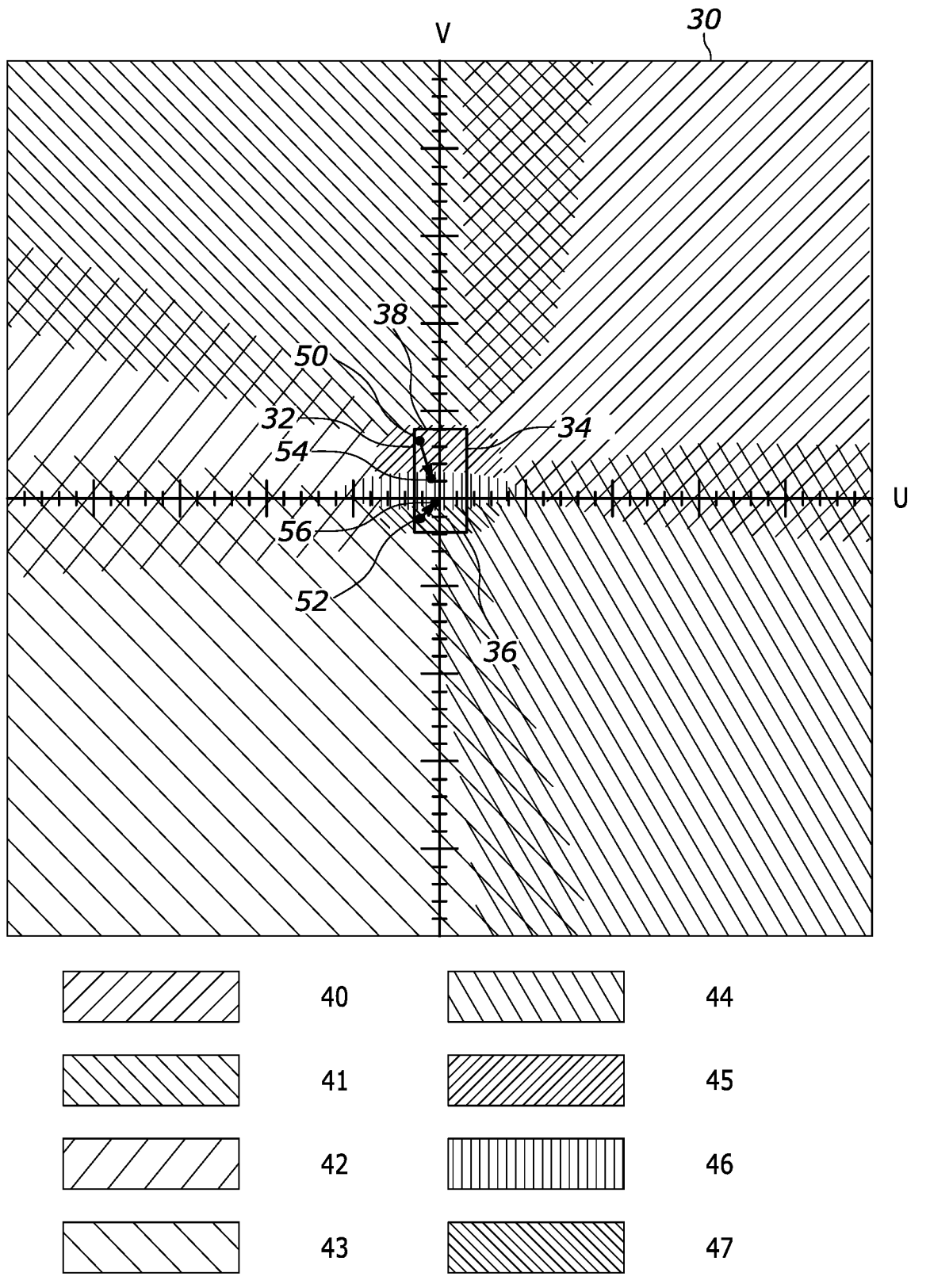
FIG. 3 illustrates a schematic representation of a UV color space of a YUV color model, along with a mitigation correction window according to an embodiment.

FIG. 3 illustrates a schematic representation of a UV color space 30 of a YUV color model. A mitigation correction window is shown near the center of the UV color space 30. The mitigation correction window is defined or bound by a minimum U-color threshold 32, a maximum U-color threshold 34, a minimum V-color threshold 36, and a maximum V-color threshold 38. These four thresholds are arranged around a center of the UV color space 30, which has a U-value of 128 and a V-value of 128, if the U and V axis of the UV color space 30 each extend between 0 and 255. The mitigation correction window defined by these four minimum and maximum values is the range in which the pixels of an image sway.

The UV color space 30 has areas of different colors, which are shown hatched differently depending on the color. The colors range from magenta 40 to red 41, yellow 42, green 43 and blue 44. Areas of mixed colors between the colors mentioned are sketched by means of overlapping hatching. Around the center point, gray tones are also distinguished from one another, ranging from a gray with a red cast 45 to a pure gray 46 to a gray with a blue cast 47.

Two exemplary color information values are shown in FIG. 3 for respective image pixels. Namely, color information for a first pixel is shown at 50, and color information for a second pixel is shown at 52. In this example, both of these points 50, 52 lie within the mitigation correction window. In other words, for both points, the U-color value is greater than the minimum U-color threshold 32, less than the maximum U-color threshold 34, greater than the minimum V-color threshold 36, and less than the maximum V-color threshold 38. Because of this, the color values for each of these pixels can be adjusted, as indicated by the two arrows. For example, the color values of the first pixel 50 can be adjusted to a new point shown at 54, and the color value of the second pixel 52 can be adjusted to a new point shown at 56.

The amount of color correction can be fixed or adjusted, depending on the system. For example, the further the determined color information is from the center of the UV color space 30, the larger the correction of color information can be. This is illustrated in FIG. 3, where the distance between the original pixel value 50 and the corrected pixel value 54 is greater than the distance between the original pixel value 52 and the corrected pixel value 56. This is because original pixel value 50 is further from the center point of the UV color space 30 than is the original pixel value 52. The amount of color correction can be programmed as a factor of how far away the color information of a pixel is from the center point. This factor can be constant, variable, weighted, or the like depending on the system demands.

According to embodiments disclosed herein, the size and shape mitigation correction window is variable. In other words, each of the minimum U-color threshold 32, maximum U-color threshold 34, minimum V-color threshold 36, and maximum V-color threshold 38 are variable. This is shown in FIG. 6 described below. This allows for the color mitigation process to be adjusted on a lens-by-lens basis. The thresholds can vary depending on the performance score of that particular lens. This allows for more of an opportunity to alter color values of poor performing lenses compared to good performing lenses.

Given the above, FIG. 4 illustrates a method 400 according to one embodiment, namely a method of grading lenses. The particular illustrated method 400 is an embodiment of establishing a baseline or benchmark score of a particular lens, and comparing a particular lens to that benchmark score. At 402, lenses are sampled from a lens product line. The product line may be for a line of lenses for vehicle cameras such as those shown in FIG. 1, for example. The product line may be for lenses in other camera applications. For a lens product line, a statistically significant amount of parts are sampled from the overall population of lenses.

At 404, test image data from these sampled lenses is acquired. For example, these sampled lenses can be tested inside of a uniform light sphere box to acquire the test image data. This assures a constant test environment for each lens. Then at 406, the image data produced by the camera using these sampled lenses is analyzed to determine the amount of change or differences between the color channels (e.g., red, green, blue) versus luminance channel (e.g., brightness, Y). This analysis can be performed for different regions of the image, such as the upper left, the bottom right, etc. Uniformity profiles may be generated or plotted, wherein the color channels versus luminance channel (RGBY levels) are plotted across the space of the region of the image being analyzed.

At 408, a benchmark for the specific performance or score of the lenses is established based on the analyses. For example, the mean or average of the delta RGB versus Y for each region of the lens tested can be used as the benchmark score for that lens's specific performance. Using the mean benchmark score as a guide, multiple lenses are selected for poor, medium, and good performance at 410. In other words, lenses with poor, medium, and good performance scores are selected. At 412, a jury analysis is used in conjunction with the benchmark scores to determine which lenses are to be input into an interpolation model. For example, a human jury can rate or rank the images produced by the lenses based on their overall uniformity and/or aesthetics. The benchmark scores associated with those lenses can be used in the interpolation model.

At 414, the scores associated with the selected poor, medium, and good lenses are input into the interpolation model, or grading model. The interpolation model can be a 1-dimensional model normalized with an output score of 1-10, for example, with 1 being the worst and 10 being the best. The jury members would provide a score in that range for each image. The grading model now allows for any lens (either previously manufactured or newly manufactured) to be assigned a uniformity score, e.g., from 1 to 10. Thus, at 416, new lenses are compared to the interpolation model to output a uniformity score. This grading score enables an accurate estimation of the non-uniformity performance of a particular lens.

As described above with reference to FIG. 3, a color mitigation correction window defined by four minimum and maximum U- and V-values defines the range in which the pixels of an image sway. The original, first, or pre-modified size of this color mitigation correction window can be determined by sampling the worst areas (e.g., cyan and red areas) of multiple images from multiple cameras, and determining the maximum and minimum U and V values of those areas. However, this color mitigation correction window can solve for a fixed predetermined color region, and does not take into account the part-to-part lens variation of non-uniformity of performance. In other words, the mitigation correction window might work well to correct the color of one lens, but not as well as correcting the color of another lens. This is because the same level of correction is applied to a bad performing lens and a good performing lens. This can cause issues in the final image, and in some cases cause the overall harmonization to be less accurate. Therefore, according to embodiments disclosed herein, the mitigation correction window can be adjusted based on the particular uniformity score associated with that lens.

Figure 5:
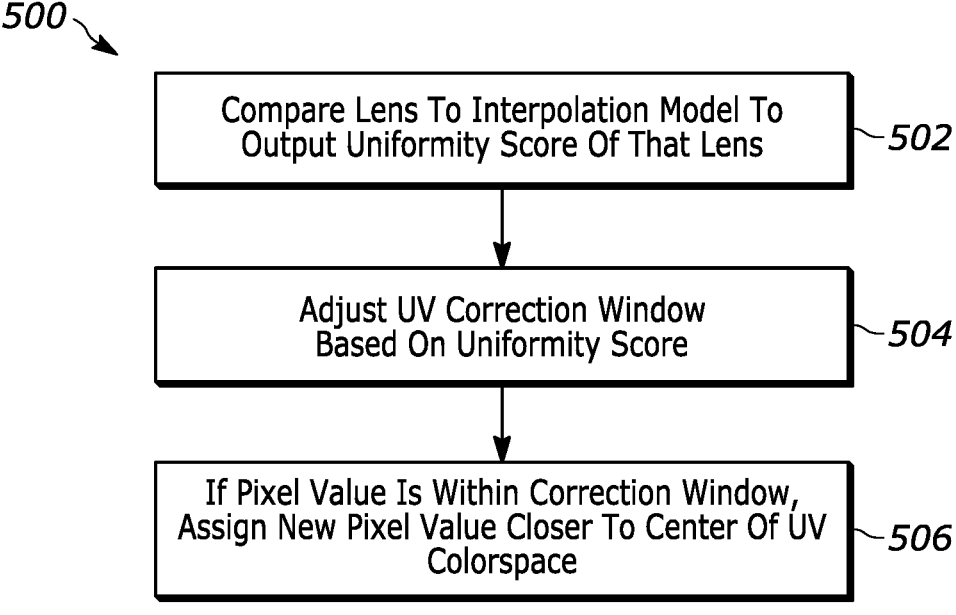
FIG. 5 illustrates a method of adjusting the mitigation correction window and altering pixel values of an image, according to an embodiment.

FIG. 5 illustrates a method 500 of adjusting the mitigation correction window and altering pixel values of an image, according to an embodiment. At 502, a particular lens is compared to the interpolation model (such as the one described above) to output a uniformity score of that lens. This is similar to 416 of FIG. 4. Then, at 504, the mitigation correction window is adjusted. The adjustment of the mitigation correction window can include an adjustment of one or more of the minimum U-color threshold 32, maximum U-color threshold 34, minimum V-color threshold 36, and maximum V-color threshold 38. The amount of adjustment can be determined based on the uniformity score of that lens. For example, if a lens has a uniformity score that is exceptional, the mitigation correction window can be reduced in size; if a lens has a uniformity score that is poor, the mitigation correction window can be enlarged.

Figures 6A, 6B, 6C:
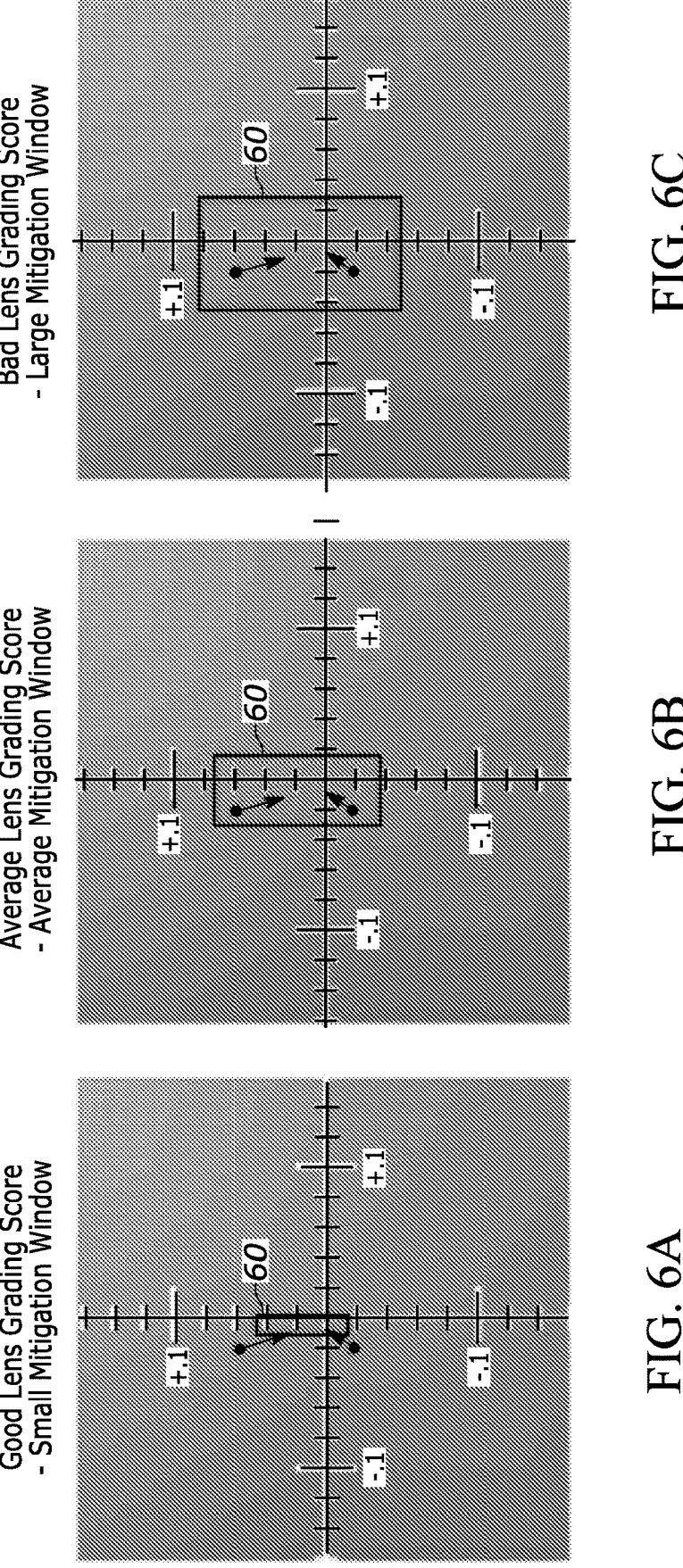
FIGS. 6A-6C illustrate various altered mitigation correction windows that are altered based on a lens grading score, according to embodiments.

This concept is illustrated in FIGS. 6A-6C, as an example. FIG. 6B shows a mitigation correction window 60 that is similar or equivalent in size to the mitigation correction window shown in FIG. 3. The size of the mitigation correction window as explained in U.S. patent application Ser. No. 17/656,359 can be applied to lenses with average uniformity. Average uniformity can be a uniformity score at or about 5, if a 1 to 10 scale is used as described above. FIG. 6A shows the mitigation correction window 60 with a reduction in size due to that particular lens having a good uniformity (e.g., scored at or about 9 out of 10). In contrast, FIG. 6C shows the mitigation correction window 60 with an enlarged size due to that particular lens having a poor uniformity (e.g., scored at or about 2 out of 10).

The amount of enlarging or shrinking of the mitigation correction window 60 can be linearly related to the uniformity score. For example, the better the lens scores in its uniformity rating, the smaller the mitigation correction window 60; likewise, the worse the lens scores in its uniformity rating, the larger the mitigation correction window 60. FIGS. 6A-6C are merely three examples of sizes of the mitigation correction window 60, and of course the mitigation correction window 60 can be many more sizes. Moreover, in the illustrated embodiments, all four thresholds or boundaries of the mitigation correction window 60 are altered together, by a common factor. However, in other embodiments, some of the thresholds or boundaries may alter differently than others. The boundary box can be any shape, depending on the complexity of the correction model.

Returning to FIG. 5, at 506, if a pixel value is within the mitigation correction window, the pixel value is assigned a new color pixel value that is closer to the center of the UV color space. This was described above with reference to FIG. 3, where the pixel at point 50 is moved to point 54, and the pixel at point 52 is moved to point 56. This is again illustrated in FIGS. 6A-6C by the arrows. The adjustment of the mitigation correction window inhibits unnecessarily correcting pixels when the lens non-uniformity grading score is very good. For example, in FIG. 6A, the pixels are not adjusted because they are not within the mitigation correction window 60. This is acceptable, because the lens has a good uniformity. Expansion of the mitigation correction window also allows for the correction of more pixels for lenses with poor uniformity, as shown by the larger mitigation correction window 60 in FIG. 6C.

Some of the processes described herein can be implemented not just in the factory setting, but when a particular lens is installed and configured for normal operation. For example, a sample image produced by a particular lens can be generated upon start-up of the system, for example when a vehicle starts (e.g., KEY-ON). At that time, the non-uniformity score of the image can be determined using the interpolation model, the size of the color mitigation window can be altered based on the non-uniformity score, and any pixel color can be altered based on the UV color values of that pixel being within the color mitigation window. The process can repeat at the next start-up of the vehicle.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method for altering colors of pixels of images produced by vehicle cameras, the method comprising:
   receiving a plurality of images generated by a plurality of cameras configured to be equipped on a vehicle;
   determining color channel values and luminance values associated with pixels of the plurality of images;
   establishing a benchmark mitigation correction window on a UV color plane of a YUV color model, wherein the benchmark mitigation correction window is defined by a benchmark U-color threshold and a benchmark V-color threshold, wherein the benchmark mitigation correction window is established based on the color channels and luminance associated with the pixels of the plurality of images;
   receiving a first image generated using a first lens of a first camera;
   determining U-color values and V-color values associated with first pixels of the first image;
   receiving a first score associated with the first lens, wherein the first score is yielded via an interpolation model;
   altering the benchmark U-color threshold and the benchmark V-color threshold of the benchmark mitigation correction window based on the first score to yield a first altered U-color threshold and a first altered V-color threshold specific to the first lens; and
   correcting the U-color values and the V-color values associated with the first pixels in response to (i) the U-color values associated with the first pixels being within the first altered U-color threshold of the altered mitigation correction window and (ii) the V-color values associated with the first pixels being within the first altered V-color threshold of the mitigation correction window.

2. The method of claim 1, further comprising:
   receiving a second image generated using a second lens of a second camera;
   determining U-color values and V-color values associated with second pixels of the second image;
   receiving a second score associated with the second lens, wherein the second score is yielded via the interpolation model;
   altering the benchmark U-color threshold and the benchmark V-color threshold based on the second score to yield a second altered U-color threshold and a second altered V-color threshold specific to the second lens; and
   correcting the U-color values and V-color values associated with the second pixels in response to (i) the U-color values associated with the second pixels being within the second altered U-color threshold and (ii) the V-color values associated with the second pixels being within the second altered V-color threshold.

3. The method of claim 2, wherein the second altered U-color threshold is different than the first altered U-color threshold.

4. The method of claim 2, wherein the second altered V-color threshold is different than the first altered V-color threshold.

5. The method of claim 2,
   wherein the correcting of the U-color values and V-color values associated with the first pixels is performed in response to the U-color values and the V-color values associated with the first pixels being within the first-mitigation correction window.

6. The method of claim 5, wherein the second altered U-color threshold and the second altered V-color threshold define a second mitigation correction window on the UV color plane, wherein the second mitigation correction window is different in size than the mitigation correction window.

7. The method of claim 1, wherein the correcting of the U-color values and V-color values associated with the first pixels includes:

converging the U-color values and V-color values associated with the first pixels toward a center of a UV color plane.

8. The method of claim 1, wherein the first camera is installed in a vehicle, the method further comprising:

repeating the receiving, altering, and correcting in response to a start-up of the vehicle.

9. The method of claim 8, further comprising:

maintaining the corrected U-color values and the corrected V-color values until the vehicle is turned off; then again repeating the receiving, altering, and correcting in response to another start-up of the vehicle.

10. A method for altering pixel colors of images produced by a vehicle camera, the method comprising:

receiving a plurality of images generated by a plurality of cameras configured to be equipped on a vehicle;

determining color channel values associated with pixels of the plurality of images;

establishing a benchmark mitigation correction window on a UV color plane of a YUV color model, wherein the benchmark mitigation correction window defines boundaries that enable the color channel values associated with the pixels to be altered only if the color channel values are within the boundaries;

determining first U-color values and first V-color values associated with first pixels of a first image generated using a first lens of a first camera;

receiving a first score associated with the first image, wherein the first score is yielded via an interpolation model;

altering a size of the benchmark mitigation correction window based on the first score to yield an altered mitigation correction window; and correcting the first U-color values and the first V-color values in response to both the first U-color values and the first V-color values being within the altered mitigation correction window.

11. The method of claim 10, further comprising:

determining second U-color values and second V-color values associated with second pixels of a second image generated using a second lens;

receiving a second score associated with the second image, wherein the second score is yielded via the interpolation model; and altering the size of the benchmark mitigation correction window based on the second score to yield a second altered mitigation correction window that is specific to the second lens.

12. The method of claim 11, further comprising:

correcting the second U-color values and the second V-color values in response to both the second U-color values and the second V-color values being within the second altered mitigation correction window.

13. The method of claim 12, wherein the second altered mitigation correction window is different in size than the altered mitigation correction window.

14. The method of claim 10, wherein the correcting of the first U-color values and the first V-color values includes:

converging the first U-color values and the first V-color values toward a center of the UV color plane.

15. The method of claim 10, wherein the first camera is a vehicle camera installed in a vehicle, the method further comprising:

performing the receiving, altering, and correcting in response to a start-up of the vehicle;

maintaining the corrected first U-color values and the corrected first V-color values until the vehicle is turned off; and repeating the receiving, altering, and correcting in response to another start-up of the vehicle to obtain new corrected first U-color values and new corrected first V-color values.

16. A system for altering pixel colors of images produced by a vehicle camera, the system comprising:

a vehicle camera installed in a vehicle, wherein the vehicle camera includes a lens;

a processor coupled to the vehicle camera and programmed to:

receive a benchmark U-color threshold and a benchmark V-color threshold that are determined based on color channels and luminance associated with pixels generated by other vehicle cameras;

receive a first image generated from the vehicle camera;

determine U-color values and V-color values associated with first pixels of the first image;

receive a first score associated with the first image, wherein the first score is yielded via an interpolation model;

alter the benchmark U-color threshold and the benchmark V-color threshold based on the first score to yield an altered U-color threshold and an altered V-color threshold; and correct the U-color values and the V-color values associated with the first pixels only if (i) the U-color values associated with the first pixels are within the first altered U-color threshold and (ii) the V-color values associated with the first pixels are within the first altered V-color threshold.

17. The system of claim 16, wherein the processor is further programmed to:

receive a second image generated using a second lens of a second vehicle camera;

determine U-color values and V-color values associated with second pixels of the second image;

receive a second score associated with the second image, wherein the second score is yielded via the interpolation model;

alter the benchmark U-color threshold and the benchmark V-color threshold based on the second score to yield a second altered U-color threshold and a second altered V-color threshold specific to the second lens; and correct the U-color values and V-color values associated with the second pixels only if (i) the U-color values associated with the second pixels are within the second altered U-color threshold and (ii) the V-color values associated with the second pixels are within the second altered V-color threshold.

18. The system of claim 17, wherein the second altered U-color threshold is different than the first altered U-color threshold, and wherein the second altered V-color threshold is different than the first altered V-color threshold.

19. The system of claim 17, wherein the first altered U-color threshold and the first altered V-color threshold define a first mitigation correction window on a UV color plane; and wherein the correcting of the U-color values and V-color values associated with the first pixels is performed only if the U-color values and the V-color values associated with the first pixels are within the first mitigation correction window.

\* \* \* \* \*